R. U. HARRIS & G. MOLIDOR.
DRILL.
APPLICATION FILED JULY 14, 1914.
1,203,112.
Patented Oct. 31, 1916.
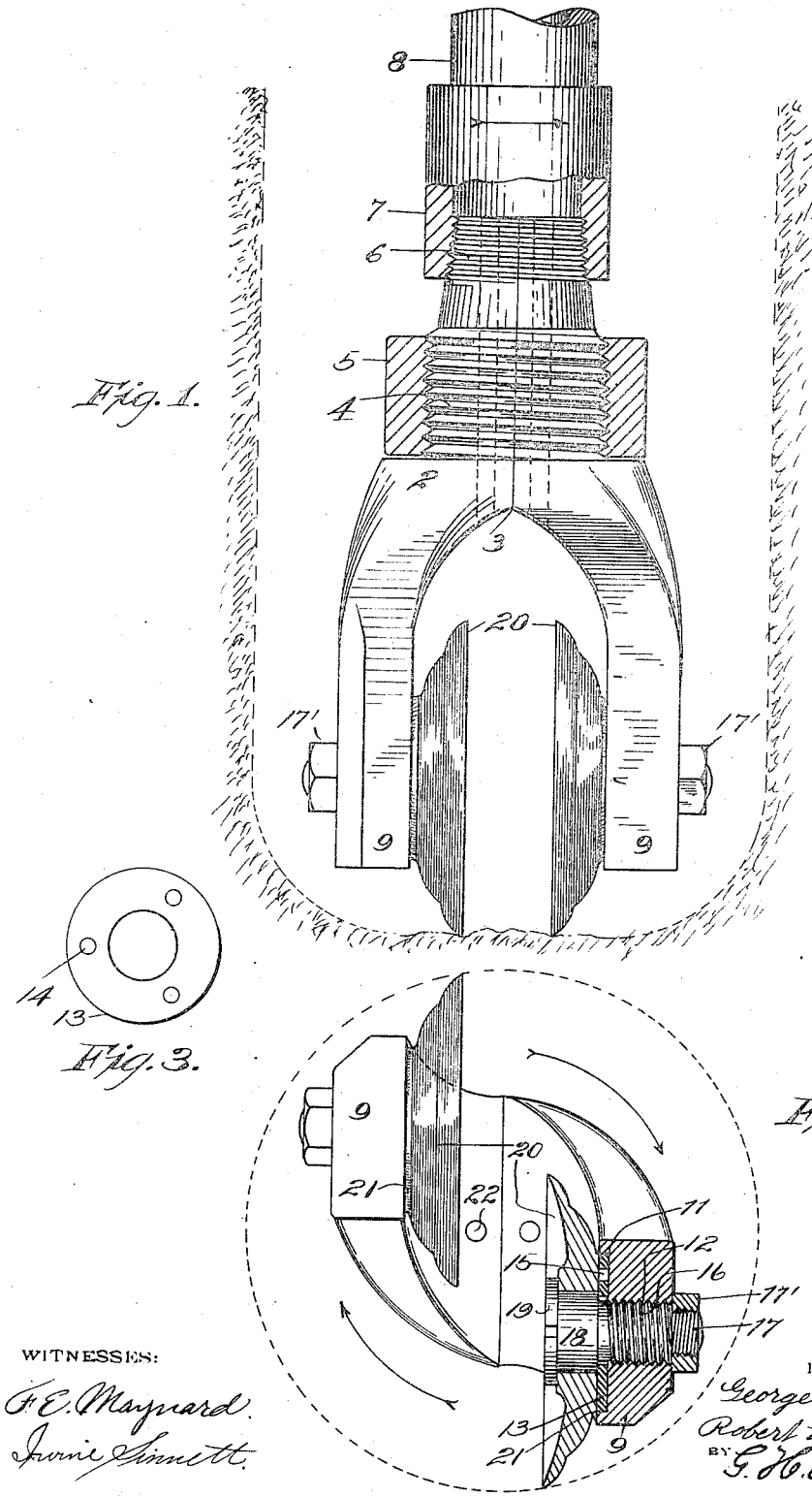
WITNESSES:
F. E. Maynard
Irvine Sinnett
INVENTORS
George Molidor
Robert U. Harris
BY G. H. Strong
ATTORNEY

UNITED STATES PATENT OFFICE.

ROBERT U. HARRIS, OF WHITTIER, AND GEORGE MOLIDOR, OF FELLOWS, CALIFORNIA, ASSIGNORS TO ROTARY DISC BIT COMPANY, OF FELLOWS, CALIFORNIA, A CORPORATION OF CALIFORNIA.

DRILL.

1,203,112.      Specification of Letters Patent.      Patented Oct. 31, 1916.

Application filed July 14, 1914. Serial No. 851,001.

*To all whom it may concern:*

Be it known that we, ROBERT U. HARRIS, of Whittier, in the county of Los Angeles and State of California, and GEORGE MOLIDOR, of Fellows, in the county of Kern and State of California, citizens of the United States, have invented new and useful Improvements in Drills, of which the following is a specification.

This invention relates to rotary disk bit drills.

It is an object of the present invention to improve drills of the type involving rotary disk bits, whereby the bits may be readily mounted and dismounted, and which are of strong and durable construction.

It is a further object of the present invention to provide a rotary disk bit drill in which the head or main member is made of separable pieces which may be securely and readily assembled and thereby permit the ready removal and renewal of parts.

The invention consists of the parts and the construction and combination of parts as hereinafter more fully described and claimed, having reference to the accompanying drawings, in which—

Figure 1 is an elevation of the bit, with parts in section. Fig. 2 is a horizontal section on the line x—x, Fig. 1. Fig. 3 is a detail of one of the wearing plates or washers.

The present drill includes a body or head, which is shown in Fig. 1 as formed with a substantially solid circular body 2, which is split along the line 3 in halves, although it is understood that the head 2 may be formed of one piece, if desired. When formed of halves, the upper portion of the head 2 is provided with screw-threads 4, about which may be turned a clamping collar 5 for securing the halves together. Above the threads 4 the head is provided with tapering threads 6 whereby the drill head may be suitably attached, as by a sleeve or collar 7, to a drill rod or tube 8.

Depending from the lower side of the head 2 are spaced legs 9 which are so positioned as to stand parallel to each other and offset edgewise; the legs 9 being sufficiently separated to form a clearance space for intruded cutters. The legs 9 may be twisted diagonally relative to the body of the head 2, or they may be forged in their proper relation without any twisting of the metal to bring them in the proper position, thereby avoiding the strains which are produced when the legs are twisted and also rendering the legs stronger at the point of junction with the body or head 2. The inner surfaces, adjacent to the ends, of the legs 9 are countersunk or recessed, as at 11, annularly about transverse, screw-threaded holes 12, of which there is one in each leg.

Insertible in the recesses or countersinks 11 are removable, reversible and interchangeable washers 13, which are provided with apertures 14, Fig. 3, one of which is adapted to be passed over a stationary lug or projection 15 formed or provided in each recess 11. These projections 15 serve the function of preventing the washers 13 from rotating. Into each of the screw holes 12 there is screwed a substantial screw 16 fitting the threads of the screw hole 12; the smaller end of each screw being downturned and provided with threads 17 of a reverse pitch to the threads on the body of the screw.

Each screw 16 is provided with a shoulder 18, adapted to bear against the washer 13 and has a head 19, between which and the washer 18 there is mounted, upon the screw 16, a concavo-convex disk or cutter member 20. The cutter member 20 is provided with a rear central hub portion 21 adapted to bear upon the countersunk washer 13, there being a cutter 20 mounted on each leg 9, and of sufficient diameter to project beyond the edges of the legs so that when power is applied to rotate the cutter head 2 the cutters will engage and abrade the bottom surface of the drill hole.

In assembling a cutter 20, after a washer 13 has been adjusted in its recess 11 on one of the legs 9, the screw 16 is passed through the center bore of the cutter and the screw is then adjusted in the screw hole 12, from the inner side of the leg, and tightened up, after which a lock-nut 17' is screwed up on the reverse threads 17 and locks the screw 16 firmly in position.

In manufacturing this type of bit, in some sizes the drill head 2 may be of one piece; the size of the body 2 and the relative offset position of the legs 9 being such as to permit the ready mounting and dismounting of a pivot screw 16, with its cutter 20, upon the inside surface of one of the legs 9. In manufacturing small sized tools of this type, however, it is desirable that the head 2 be made of two pieces which may be separated for the ready assembling and dismounting of the cutters on the inner surfaces of the legs 9.

To facilitate drilling operations, the drill body may be provided with suitable water ducts 22 for the conveyance of water to the bottom of the well from any suitable source of supply connected to the tube 8.

The disk 20 is thickened at its intermediate convex side and has an outer thin portion which will, while wearing away, keep a good cutting edge.

Having thus described our invention, what we claim and desire to secure by Letters Patent is—

1. In a rotary bit drill, a drill head having spaced legs each having a threaded transverse opening therein, a pin projecting from each leg adjacent the opening therein, a washer plate provided with a central bore and a concentric series of apertures which latter are to selectively engage with the pin of a leg for adjustment of the washer, a rotary cutter having a bore of greater diameter than the bore of the washer, the bores of the cutter and washer being disposed in coincidence with each other and the threaded leg opening, and a screw pin passing through the bores of the cutter and washer and threaded in the opening of the leg, said screw pin having a shoulder engaging with the washer and a head bearing against the cutter to retain the latter on the pin.

2. A drill including a head having spaced legs, concavo-convex disks mounted for rotation relative to and connected to the legs, each of said disks having stepped annular reinforcing portions upon its convex face.

In testimony whereof we have hereunto set our hands in the presence of two subscribing witnesses.

ROBERT U. HARRIS.
GEORGE MOLIDOR.

Witnesses:
  W. J. HOLLAND,
  R. T. JONES.
  W. J. HOLLAND,
  I. SMITH.